Sept. 23, 1924.  
F. BLOOR  
1,509,124  
TRAILER FEEDER ATTACHMENT FOR COMBINED HARVESTER THRASHERS  
Filed Nov. 25, 1922   6 Sheets-Sheet 3
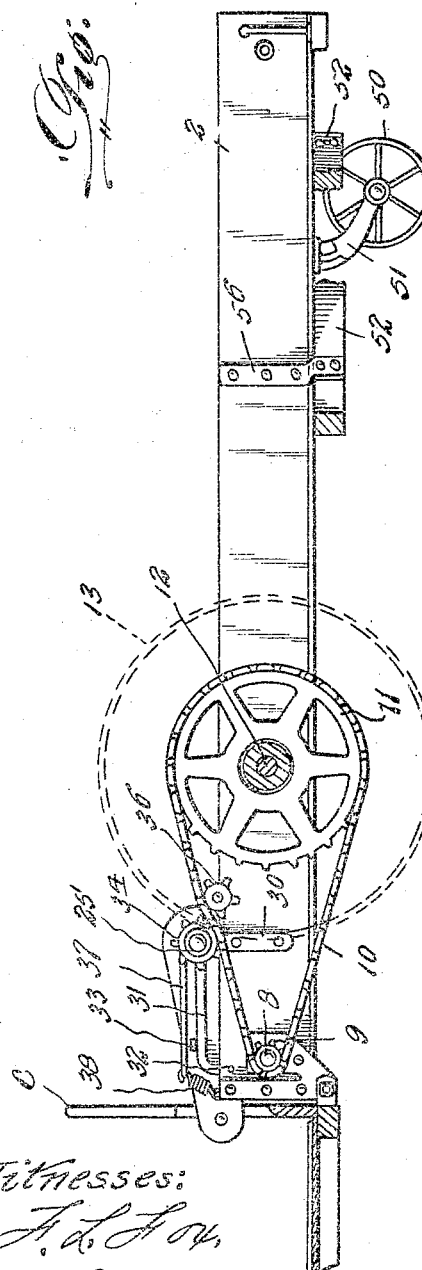
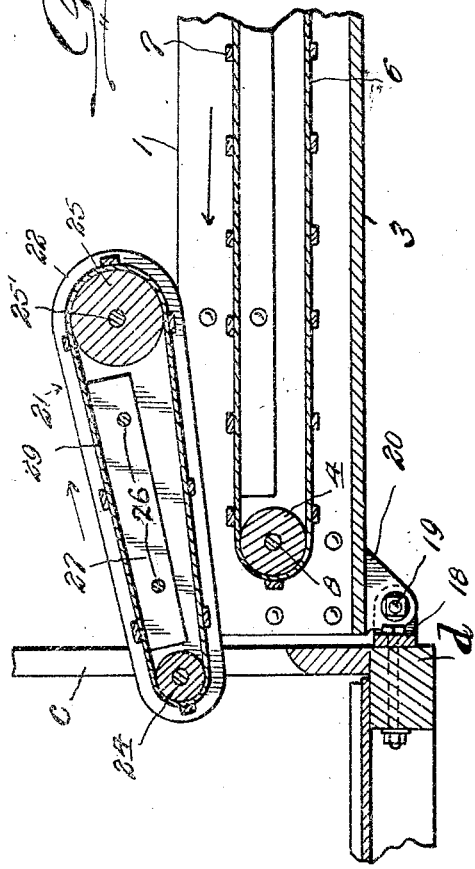
Frank Bloor,
INVENTOR.

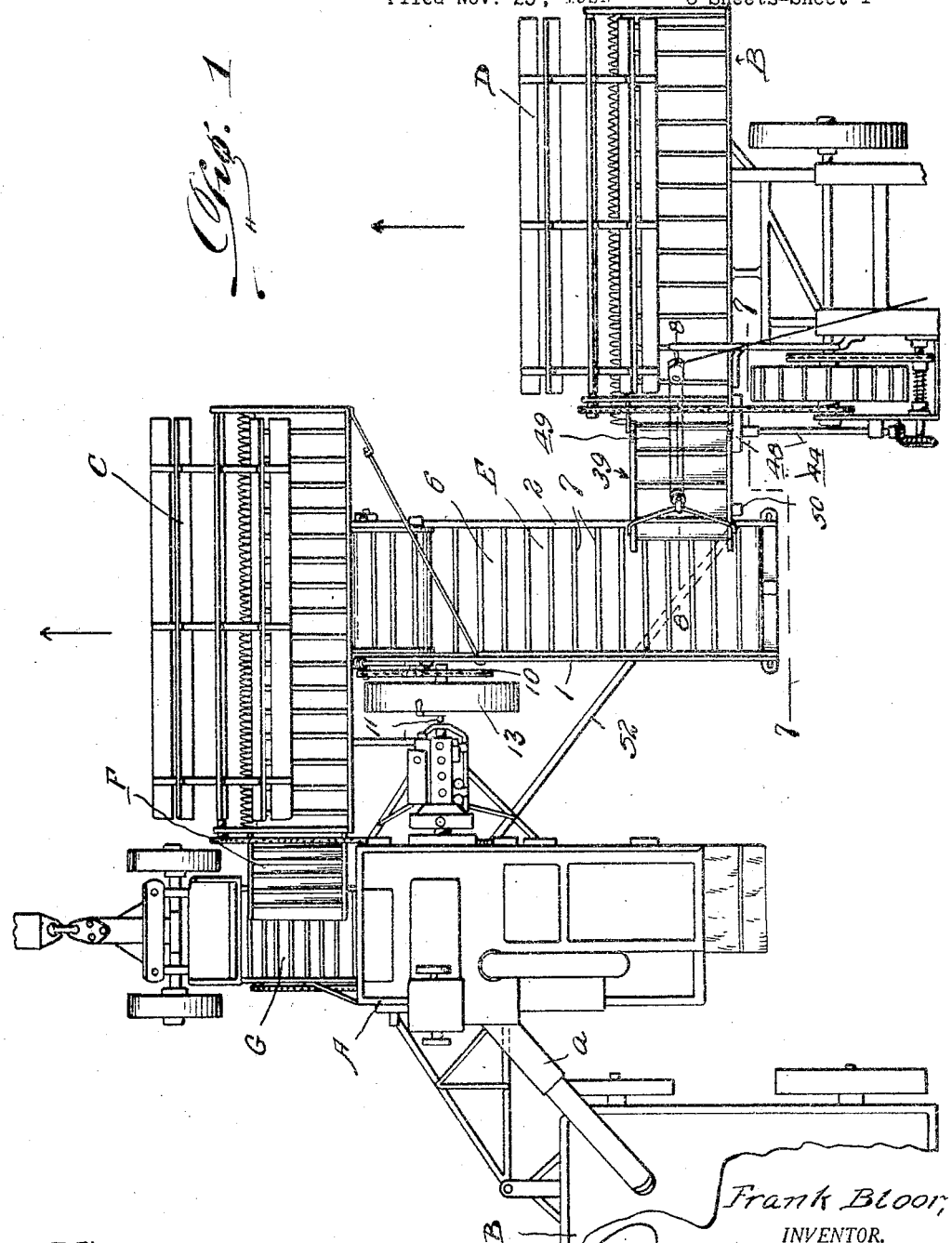

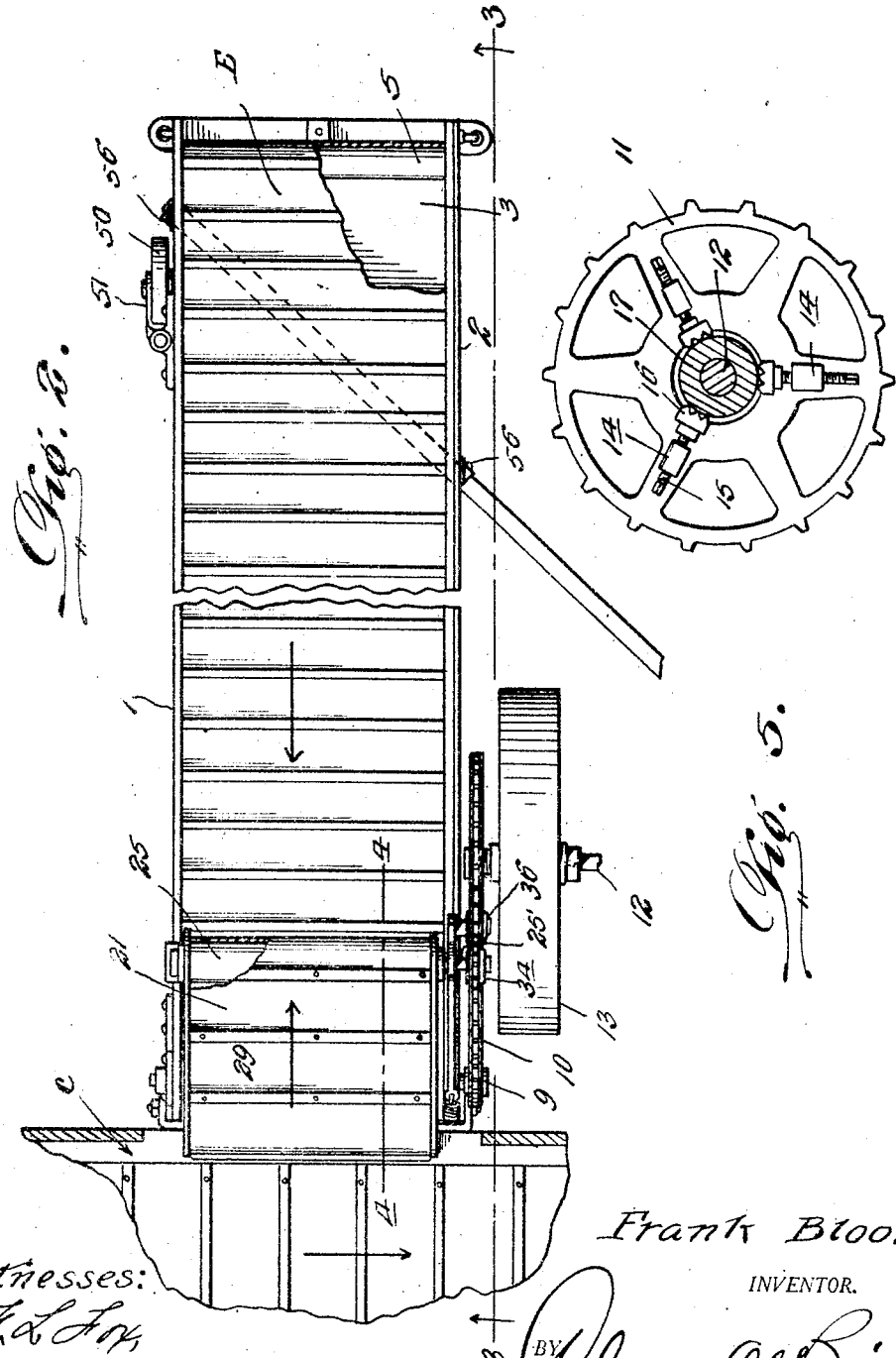

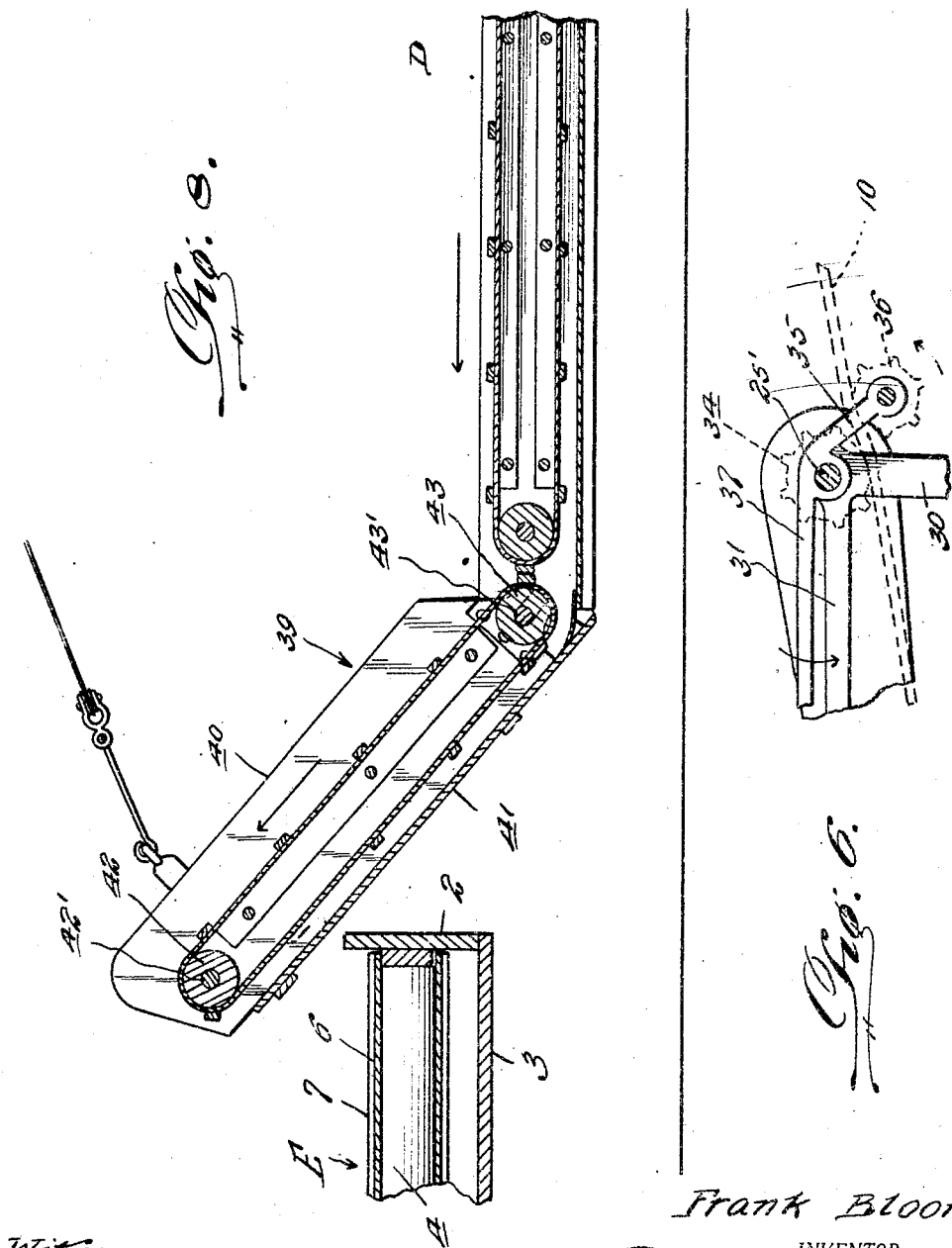

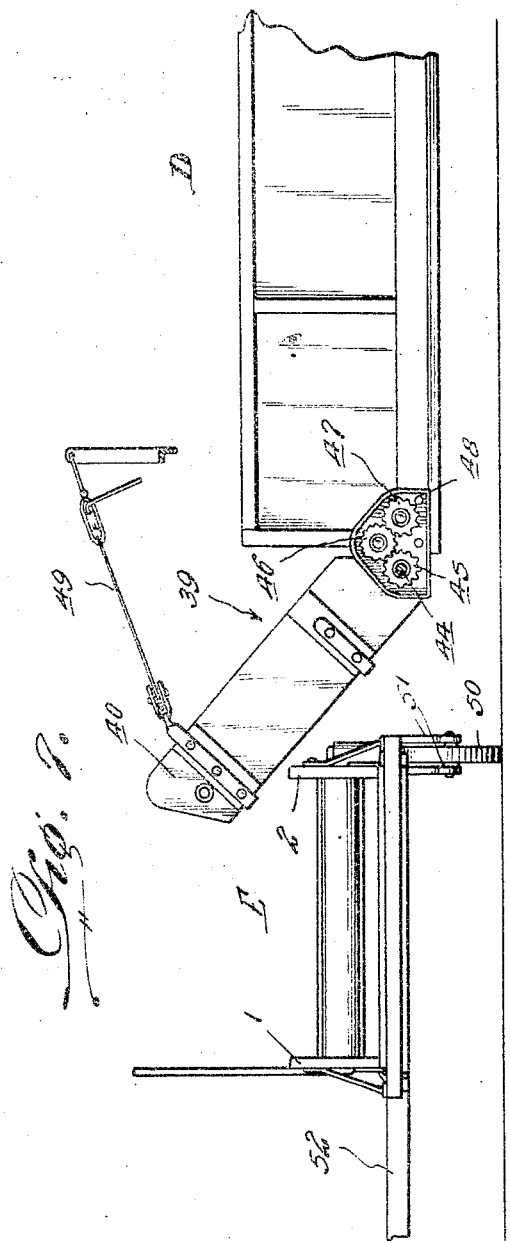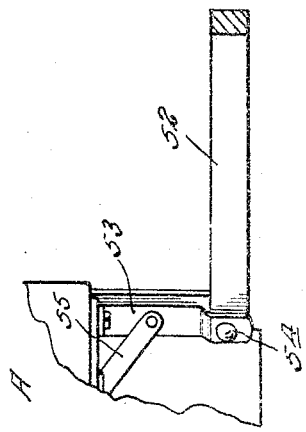

Sept. 23, 1924. 1,509,124
F. BLOOR
TRAILER FEEDER ATTACHMENT FOR COMBINED HARVESTER THRASHERS
Filed Nov. 25, 1922    6 Sheets-Sheet 6
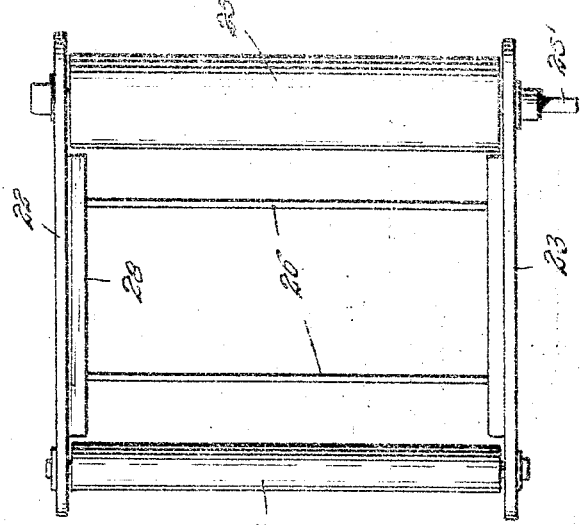
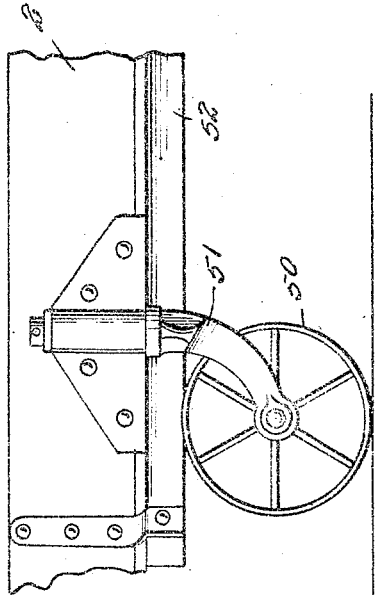
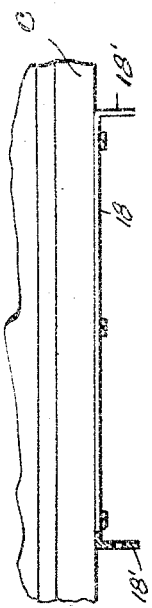
Witnesses:
Frank Bloor,
INVENTOR.
ATTORNEY.

Patented Sept. 23, 1924.

1,509,124

UNITED STATES PATENT OFFICE.

FRANK BLOOR, OF BUCKLIN, KANSAS.

TRAILER FEEDER ATTACHMENT FOR COMBINED HARVESTER THRASHERS.

Application filed November 25, 1922. Serial No. 603,176.

*To all whom it may concern:*

Be it known that I, FRANK BLOOR, a citizen of the United States, residing at Bucklin, in the county of Ford and State of Kansas, have invented certain new and useful Improvements in Trailer Feeder Attachments for Combined Harvester Thrashers, of which the following is a specification.

This invention relates to trailer feeder attachments for combined harvester thrashers, whereby an additional header or harvester may be employed rearwardly of the main harvester for allowing the machine to substantially double the length of the cut of the grain as is now the case with conventional harvester thrashers, the said trailer feeder attachment being adapted to convey the grain from the rear header or harvester to the front main harvester.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein;

Figure 1 is a top plan view of a combined harvester thrasher together with an auxiliary header or harvester rearwardly of the main harvester, showing my improved trailer feeder attachment therebetween.

Figure 2 is a top plan view of the feeder for conveying the cut grain from a rear header or harvester to the platform canvas of the combined harvester thrasher, one of the panels of the wind brake of the front harvester being removed for establishing communication between trailer feeder attachment and the front platform canvas.

Figure 3 is a side elevational view of the trailer, shown in Figure 2, and taken substantially on the line 3—3 of this figure.

Figure 4 is an enlarged fragmentary cross sectional view upon the line 4—4 of Figure 2.

Figure 5 is a detailed view of a sprocket wheel carried by a certain one of the supporting wheels of the combined harvester thrasher, whereby through the instrumentality of suitable chain gearing, motion is imparted to the canvas of the above mentioned trailer feeder.

Figure 6 is an enlarged detail view of the chain tightening means employed in connection with the chain gearing between the sprocket wheels shown in Figure 5, and the canvas operating shaft for the trailer feeder shown in Figures 2, 3 and 4.

Figure 7 is an enlarged rear elevational view taken substantially upon the line 7—7 of Figure 1, and showing the relative position of the auxiliary header or harvester, with respect to the trailer feeder.

Figure 8 is a still further enlarged transverse cross sectional view of the trailer feeder and auxiliary header or harvester shown in Figure 7 and taken on the line 8—8 of Figure 1.

Figure 9 is an enlarged fragmentary perspective view of a portion of the inner side frame of the thrasher, disclosing an improved means for securing one end of a connecting bar thereto, the other end of this bar being adapted to extend rearwardly beneath the trailer feeder shown in Figures 2, 3 and 4 to be connected thereto in a manner as shown specifically in Figure 3.

Figure 10 is an enlarged fragmentary side elevational view of one end of the trailer feeder between the headers.

Figure 11 is a top plan view of an auxiliary compressor canvas employed in connection with the front end of the trailer feeder as shown in Figure 4, the endless canvas being removed therefrom and Figure 12 is a top plan view of a supporting bracket carried by the rear edge of the harvester thrasher platform for rigidly securing the front end of the trailer feeder thereto.

Referring to the drawings, and particularly to Figure 1, I have shown my trailer feeder as being connected to the usual harvester C of a combined harvester thrasher, the thrasher being denoted by the letter A, which thrasher has a grain outlet "*a*" for communicating with any type of grain receiving wagon B.

My trailer feeder connected to the said harvester of the combined harvester and thrasher extends rearwardly therefrom as shown, and is designated by the letter E. This trailer feeder is adapted to receive the cut grain from any conventional type of harvester or header D that is moved over the field in any suitable manner, and at a position to the rear of the harvester of the main harvester thrasher.

Describing my invention more in detail, and having particular reference to Figures 2 to 5 inclusive and 10, 11 and 12, the rearwardly extending trailer feeder E comprises side walls 1 and 2, and a bottom wall 3. Between the side walls 1 and 2 of this feeder frame, and adjacent the front and rear rotary transverse supporting rollers 4 and 5 respectively, and adapted for movement over these rollers is a desirable form of endless canvas 6 having the usual spaced transversely extending slats 7 thereon. Each of the rollers 4 and 5 are provided with a central bore for receiving a shaft 8, the shaft of the front roller 4 extending outwardly of the said wall 2 of the conveyor frame and having keyed thereto or otherwise secured a relatively small sprocket wheel 9. Mounted upon the thrasher supporting wheel 13 is a large sprocket wheel 11, said sprocket wheel being operatively connected to the small sprocket wheel 9 by sprocket chain 10. It will be readily appreciated that any movement of the combined harvester thrasher over the ground will rotate the supporting wheel 13, thus imparting a rotary movement to the front shaft and roller 4 for actuating the trailer feeder canvas 6.

One of the panels forming the wind brake "c" of the harvester thrasher is removed for providing an opening therethrough, as shown in Figures 2, 3 and 4, for a purpose hereinafter described. The inner longitudinal frame bar "d" of the harvester thrasher platform has rigidly secured thereto, by bolts or other suitable connections, a relatively enlarged U bracket 18. The rearwardly extending ears 18' of this bracket are adapted for pivotally receiving therebetween, by a pivot rod 19, the front end of the trailer feeder E. The undersurface of the bottom wall of the feeder E is suitably provided with spaced, perforated brackets 20, for the reception of the ends of the pivot rod 19. It is to be understood that the outlet end of the trailer feeder E has communication with the platform canvas of the header or harvester C of the combined harvester thrasher through the opening formed in the wind brake "c". As a means for compressing the grain so as to spread the same in a filmlike manner upon the platform canvas of a harvester thrasher, there is provided at the outlet end of the feeder E and at a point slightly thereabove, a compressor canvas designated in general by the numeral 21. This compressor is more clearly shown in Figures 4 and 11, and comprises suitably spaced side plates 22 and 23 having journaled therebetween and at the front end thereof, a relatively small canvas belt roller 24. Similarly supported between the side members and at the rear end thereof, is a relatively enlarged canvas roller 25, and between the side members 22 and 23, are spaced reinforcing rods 26. There is also provided upon the inner surface of the side members 22 and 23, a longitudinally extending plate 27, the upper end of which is flanged as at 28, for allowing the edges of the canvas 29 to be supported thereon, it being understood that the canvas 29 is adapted for movement over the said rollers 24 and 25, this canvas being endless in its nature.

As a means for supporting the compressor canvas 21 at the forward or outlet end of the feeder E, the side walls 1 and 2 of the frame of the said feeder has secured thereto, a vertically extending bracket arm 30, the upper end of this arm being bent and reduced and extending forwardly as at 31 to be also secured to the side walls of the feeder E as at 32. Each side arm or plate 22 and 23 of the compressor 21, is provided upon the outer side thereof, with a small lug 33. These lugs are adapted for engagement upon the forwardly extending arms 31, of the brackets 30 for limiting the downward pivotal movement of the compressor within the brackets, it being noted that the supporting shaft 25' of the rear roller 25 loosely engages through suitable openings formed in the before mentioned supporting brackets 30. One end of the supporting shaft 25' of the rear roller 25 extends through the side arm or frame 23 of the compressor 21, and has suitably keyed thereto, a sprocket wheel 34, which sprocket wheel has engagement with the before described sprocket chain 10, whereby movement may be imparted to the canvas 29 whenever the canvas 6 of the trailer E is actuated. For normally maintaining the sprocket chain 10 in engagement with the sprocket wheel 34 of the shaft 25', there is pivotally secured to the said shaft, and between the sprocket gear 34 and supporting bracket 30, a downwardly extending arm 35 having journaled in the end thereof, an idler sprocket 36. The upper end of this pivoted arm 35 terminates in a forwardly extending arm 37, said arms extending parallel with the side wall 2 of the trailer E and being resiliently secured to this side wall through the instrumentality of the small relatively strong coiled spring 38. The connection between this coiled spring 38 and the arm 37 is readily detachable. The forward end of the compressor 21 extends within the opening provided in the wind brake of the front harvester or header C and in view of the provision of this compressor canvas, it will be readily appreciated that the cut grain being conveyed forwardly by the canvas of the feeder will be compressed between the respective canvases 6 and 29 of the trailer and compressor for suitably conveying this grain to the platform canvas of the front harvester or header. In view of the pivotal nature of the compressor, it will be seen that a movement between the said compressor and feeder E will be allowed for permitting passages of cut grain to pass therebetween without clogging up or otherwise impairing the efficient operation of the device. Further, if at any time, it should be desired to raise the compressor 21 for cleaning the forward end of the feeder E, all that is necessary is to swing the said compressor 21 upwardly upon the shaft 25′, and again, if it is even desirable to cut out the operation of the compressor canvas 29, the spring 38 may be disengaged from the forwardly extending arm 33 for consequently allowing a downward swinging movement of the arm 35 for disengaging the idler sprocket 36 from the sprocket chain 10.

It is to be understood, that the relative position of the combined harvester and thrasher and the auxiliary header D is substantially as shown in Figure 1, that is, the inner end of the cutting reel of the header D is to be in substantial alinement with the outer end of the cutting reel of the front harvester. As a means for conveying the cut grain from the platform of the rear header D to the before described feeder E connected to the combined harvester thrasher, there is employed the usual auxiliary conveyor 39, headers of this type being usually equipped with such a conveyor. This conveyor 39 embodies a usual frame consisting of side walls 40 and a bottom wall 41 and the front platform of the rear header D carries the usual auxiliary roller 43. These conveyors 39 employed in connection with the said header are detachable from the end of the header platforms in a wellknown manner and between the side walls 40 of this conveyor, and adjacent the front end thereof, is a roller 42 upon the shaft 42′, it being also understood that the auxiliary roller 43 upon the header platform carries a roller shaft 43′. Engaging over the rollers 42 and 43, is the usual endless canvas as shown in Figure 8. One end of the roller shaft 43′ extends outwardly of the header platform and has connected thereto a spur gear 45, this shaft 43′ extending rearwardly as at 44 to be driven by the operation of the header D. This gear 45 meshes with a spur gear 46, which in turn meshes with another gear 47 upon the end of one of the roller shafts for the platform canvas of the header. The gears 45, 46, and 47 are enclosed within a casing 48, and it is to be understood that these gears together with the casing 48 are to be found on conventional types of headers. In view of the pivotal connection between the conveyor 39, and the platform of the header D, it will be readily understood that the conveyor 39 may be supported at an inclination to the platform canvas of the header for allowing the outlet end of this conveyor to have communication with the feeder E carried by the harvester thrasher as shown in Figures 7 and 8. Any desirable means may be provided for retaining the conveyor 39 in position above the feeder E, such as the block and tackle arrangement 49 between the front end of the conveyor 39 and any suitable point upon the header D.

In view of this last described conveyor 39, it will be seen that the cut grain falling upon the canvas of the platform of the rear header D will be conveyed upwardly by this conveyor into the feeder E, and should at any time, it be desired to raise or lower this conveyor, this action may be occasioned through the instrumentality of the block and tackle arrangement 49.

The feeder E carries adjacent its rear end, and at the outer side thereof, a supporting wheel 50, rotatably secured to one end of a swivel bracket 51, which bracket is suitably secured in any manner desirable to one side of the feeder E. This feeder is further supported by an outwardly and rearwardly extending rod 52 of angular cross section, which is secured at the front end thereof, to a desirable point upon the thrasher A, as more clearly shown in Figure 9. The connection means between this end of the rod 52 and the thrasher merely constitutes the provision of a downwardly extending bracket 53 bent outwardly, and thence downwardly at its lower end for engaging over the adjacent end of the rod 52 to be secured thereto by a rivet 54. A strengthening arm 55 is provided between this bracket 53, and at a point spaced therefrom upon the thrasher A. The outer end of this rod 52 extends beneath the feeder E to be secured to the side walls 1 and 2 thereof by suitable securing means 56.

Communication is established between the platform canvas of the harvester C and thrasher A through the instrumentality of the usual conveyor F of the harvester and the usual conveyor G of the thrasher.

In view of the above description, it is believed by me that the operation and advantages of the present machine will be readily appreciated by those skilled in the art, and while I have herein shown and described the preferred embodiment of the present invention, it is nevertheless to be understood that minor changes may be made therein without departing from the spirit and scope thereof as claimed.

What I claim as new is:—

1. In combination, a combined harvester and thrasher, a header positioned at the rear under one side of the harvester and movable therewith for harvesting co-operation, and a feeder attachment on the harvester for feeding the material from the header thereto, said attachment having a frame pivotally connected to the harvester frame, said harvester having an apron on the rear side thereof formed with an opening, a conveyer mounted for movement in the frame to convey material from the header to the harvester and discharge the same thereto through said opening, supporting means for the rear end of the frame of said feeder, and a compresser mounted on said frame and movable relative to the conveyer therein, said compresser projecting through the opening in the apron of said harvester for assisting the feeding of the material from the conveyer in the frame through said opening onto the harvester.

2. In combination, a combined harvester and thrasher, a header positioned at the rear and to one side of the harvester and movable therewith for harvesting co-operation, and a feeder attachment for the harvester for feeding material from the header thereto, said feeder having a frame pivotally connected to the harvester frame, a conveyer mounted in the frame for movement therein to convey material from the header to the harvester, said harvester having an upwardly extending apron on the rear side thereof formed with an opening for receiving the material from the conveyer in the frame, and a compresser for co-operation with said conveyer in the frame mounted in the forward end thereof and having a frame member pivotally connected at one end to said frame and having the other end extending through the opening in said apron, rollers mounted for rotation at the opposite ends of said frame member and an endless belt mounted on said rollers, driving means for the conveyer and the compresser, and means for limiting the pivotal movement of said compresser.

In testimony whereof I affix my signature.

FRANK BLOOR.